UNITED STATES PATENT OFFICE.

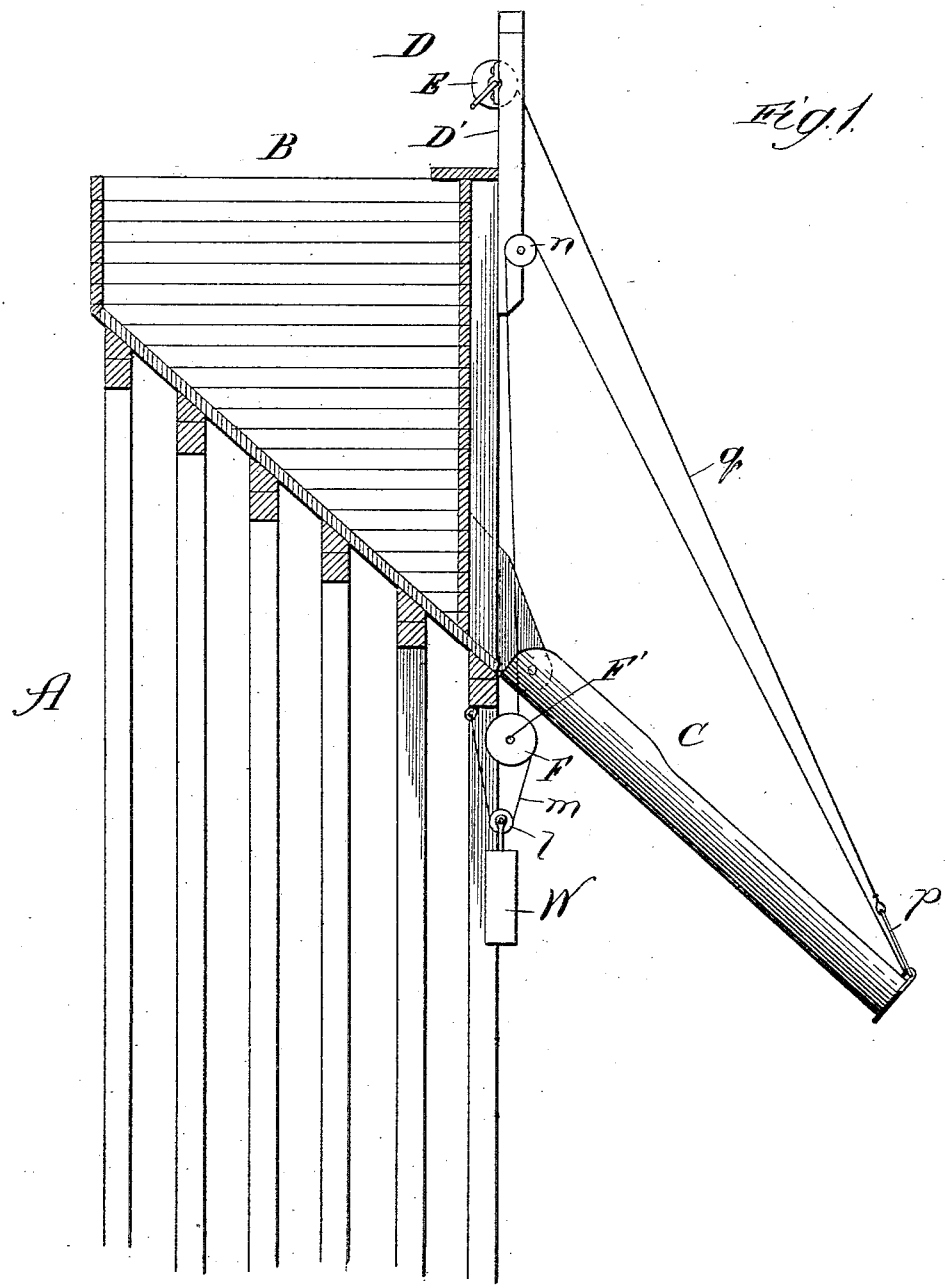

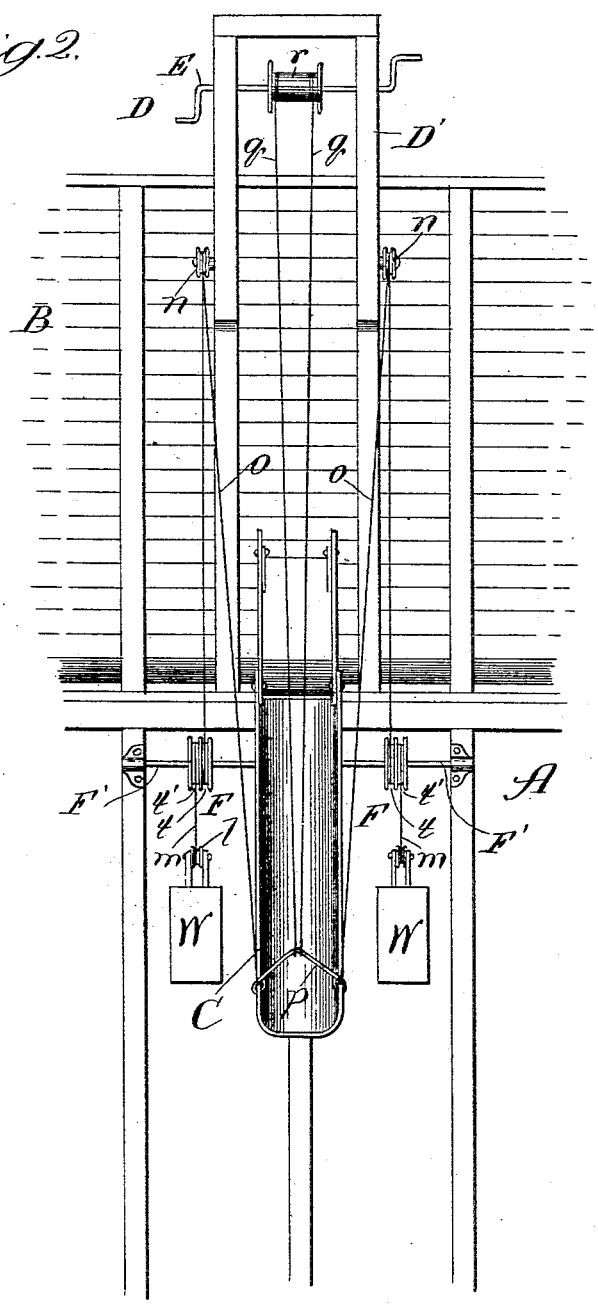

RICHARD W. ERICSON, OF AURORA, ILLINOIS.

DISCHARGE APPARATUS FOR COAL OR ORE DOCKS.

SPECIFICATION forming part of Letters Patent No. 504,675, dated September 5, 1893.

Application filed May 12, 1893. Serial No. 474,007. (No model.)

*To all whom it may concern:*

Be it known that I, RICHARD W. ERICSON, a citizen of the United States, residing at Aurora, in the county of Kane and State of Illinois, have invented a new and useful Improvement in Discharge Apparatus for Coal or Ore Docks, of which the following is a specification.

My invention relates, particularly, to an improvement in the counterbalancing mechanism for the chute through which the contents of a bin on the dock are loaded therefrom, as into a boat. The chute, in apparatus of the class to which my improvement relates, is a very heavy object, which is commonly pivoted at its inner end adjacent to the bin-opening, and adapted to be raised on its pivotal support when not in use, and lowered into its inclined operative position, by suitable hoisting mechanism; a counterbalancing device being usually provided to control the chute in its ascent and descent and thereby facilitate the working of the hoisting mechanism. As is well-known the chute, in moving from one of its two positions to the other through the vertical arc of a circle, the center of which is its pivotal support, presents the greatest resistance when horizontal. It offers the least resistance to counterbalancing in its raised position, wherein the weight is mainly sustained by the pivot, and also in its lowered position, wherein it is mainly sustained by suspension on its pivot. It being raised toward the horizontal position, the resistance of the chute obviously increases, as also in being lowered to that position.

The object of my improvement is to provide chute-counterbalancing mechanism controlled by the hoist, of novel and efficacious construction, whereby the counterbalancing effect shall increase and decrease in proportion, or desirably approximate proportion, to the increase and decrease in the resistance of the pivotal chute in its adjustment.

To this end, my invention consists in the general construction of my improved mechanism; and it also consists in details of construction and combinations of parts.

Referring to the accompanying drawings—Figure 1 is a view in sectional side elevation of a dock provided with my improvement; and Fig. 2 is a view of the same in front elevation.

A is the dock, of usual or any suitable construction; B being the bin at the opening in the base of which the chute C, also of usual or any suitable construction, is pivotally supported at its inner end.

D is the hoisting mechanism, ordinarily provided in the form of an upright frame D', extending above the bin at its front side, and supporting the drum-carrying rotary shaft or shafts by which to control cable or chain connections between them and the chute and counterbalance.

By means of my improvement I require but a single crank shaft E on the frame D' centrally supported on which is the drum $r$ connected by a cable, chain, or the like, $q$, preferably in the two lengths thereof illustrated, with the chute C near its outer end, the connection therewith illustrated being through the medium of a pivoted bail $p$. I also extend, from near the outer end of the chute, cables, chains, or the like, $o$, preferably two in number, one for each side of the chute, (though it were within the spirit of my invention to employ a single one for the purpose) about guide pulleys $n$ at opposite sides of the frame D'; and from the guide pulleys the said cables, chains, or the like, are connected, each, with a double drum F, supported to rotate in proper position on a shaft F', the preferred position of which is at the front of the dock below the base of the bin. Each of the drums F is provided with two corresponding peripheral grooves $t$ and $t'$, in one of which the cable $o$ is wound, and thence extended into and wound in the other, (being, however, so fastened on its drum as to render it practically a separate length or section of cable in each groove,) from which it passes to the base of the bin, or other stable object, and is there fastened at its end to form a loop $m$ in which is suspended a weight W through the medium of an anti-friction roller or pulley $l$.

Instead of providing each cable, or the like, $o$, in a continuous length, as described, I prefer, as shown, to divide it at a drum F, fastening one end thereto at one of its grooves, and the other end, from which the loop m is formed, in the adjacent groove.

Following is a description of the operation of the apparatus provided with my improvement: To raise the chute from the operative position in which it is illustrated to that in which it is out of use, the crank shaft E is turned to wind upon it the cable q, whereby the drums F are turned by the weights in a direction to produce lowering of them. By so turning, the drums F wind upon them in their grooves t the ends of the cables o there attached; and the width of the peripheral grooves being just about sufficient to accommodate the width of the cable, the latter will rapidly tend by accumulation in winding to increase the diameter of each drum at its grooves t, while the cable from the other grooves t', which correspond with the grooves t as to dimensions, will pay out, thereby decreasing the diameters of the drums at the said grooves t'. Thus, as the chute rises toward a horizontal position, whereby its resistance increases, as described, the circumferential accumulation of cable in both grooves t and t' of each drum F will become more and more alike until it is so, or substantially so, when the chute reaches the horizontal position, wherein the leverage of the chute on the weights, through the medium of the drums, is the least. As the rise of the chute is continued, the accumulation of cable in the grooves t will increase, while that of the cable in the grooves t' will decrease, thus decreasing the leverage of the weights on the chute through the medium of the drums F. As will be seen, the same proportionate relations between the varying diameters of the drums F, the weights and the chute are, obviously, maintained throughout the lowering movement of the latter.

What I claim as new, and desire to secure by Letters Patent, is—

1. In combination with the pivotal chute at a bin, of a coal, ore, or the like, dock, hoisting mechanism having a drum shaft connected by a flexible connecting medium, with the chute near its outer end, a rotary drum having a double-grooved periphery and supported on the dock, and a flexible weight-suspending medium, fastened to the chute toward its outer end, extending thence to the said drum into both grooves thereof to wind and unwind respectively in opposite directions therein, the width of each of the said grooves being such, with relation to that of the said weight-suspending medium, as to cause the latter to wind and unwind upon itself therein and a weight suspended on said medium below the drum, substantially as and for the purpose set forth.

2. In combination with a pivotal chute at a bin, of a coal, ore, or the like, dock, hoisting mechanism having a drum shaft connected by a flexible connecting medium, with the chute near its outer end, a rotary drum having a double-grooved periphery and supported on the dock, and a flexible weight-suspending medium, fastened to the chute toward its outer end, extending thence over a guide pulley to, and divided at, the said drum and fastened at its divided end to one of said grooves, the other section being fastened at one end to the adjacent groove and at its opposite end to the dock, and supporting between its ends a weight, the said sections winding in opposite directions in the said grooves, the width of each of said grooves being such, with relation to that of its said section, as to cause the latter to rapidly accumulate upon itself in the winding thereof in its groove substantially as and for the purpose set forth.

3. In combination with a pivotal chute at a bin, of a coal, ore, or the like, dock, hoisting mechanism comprising a frame D', supporting guide-pulley n and a rotary shaft E carrying a drum r, a connection q between the drum and the chute near its outer end, a shaft F' supported below the drum r, drums F on the shaft F', and each provided with grooves t t', flexible weight-suspending mediums, fastened to the chute near its outer end and extending thence over the guide pulleys n to, and divided at, the drums F, with the end of one section of each fastened to a groove t, and with an end of the other section of each fastened to a groove t', with its opposite ends fastened to the dock, to form the loops m, the width of each of said grooves being such, with relation to that of its said section, as to cause the latter to wind and unwind upon itself therein and weights W suspended in the loops, the whole being constructed and arranged to operate substantially as described.

RICHARD W. ERICSON.

In presence of—
F. W. PAGEL,
F. H. FALK.